US012493673B2

(12) United States Patent
Yeh et al.

(10) Patent No.: US 12,493,673 B2
(45) Date of Patent: Dec. 9, 2025

(54) SYSTEMS OF AND METHODS FOR MANAGING TENANT AND USER IDENTITY INFORMATION IN A MULTI-TENANT ENVIRONMENT

(71) Applicant: CA, Inc., San Jose, CA (US)

(72) Inventors: Wei Jen Yeh, San Jose, CA (US); Gary Tomic, Ontario (CA)

(73) Assignee: CA, Inc., San Jose, CA (US)

( * ) Notice: Subject to any disclaimer, the term of this patent is extended or adjusted under 35 U.S.C. 154(b) by 246 days.

(21) Appl. No.: 18/307,305

(22) Filed: Apr. 26, 2023

(65) Prior Publication Data

US 2024/0248968 A1    Jul. 25, 2024

Related U.S. Application Data

(60) Provisional application No. 63/440,053, filed on Jan. 19, 2023.

(51) Int. Cl.
*G06F 21/31* (2013.01)

(52) U.S. Cl.
CPC ...... *G06F 21/31* (2013.01); *G06F 2221/2113* (2013.01)

(58) Field of Classification Search
CPC .................. G06F 21/31; G06F 2221/2113
See application file for complete search history.

(56) References Cited

U.S. PATENT DOCUMENTS

| | | | | | |
|---|---|---|---|---|---|
| 6,157,930 | A * | 12/2000 | Ballard | ............... | G06F 16/9574 707/999.203 |
| 6,246,670 | B1 * | 6/2001 | Karlsson | ............. | H04L 61/5053 370/338 |
| 6,563,824 | B1 * | 5/2003 | Bhatia | ..................... | H04L 61/00 370/352 |
| 6,614,774 | B1 * | 9/2003 | Wang | .................. | H04L 61/5007 370/342 |
| 6,857,009 | B1 * | 2/2005 | Ferreria | .................. | H04L 69/16 709/224 |
| 7,003,619 | B1 * | 2/2006 | Moore | ................. | G11C 7/1006 365/236 |
| 7,062,602 | B1 * | 6/2006 | Moore | .................... | G06F 16/10 711/111 |
| 7,155,608 | B1 * | 12/2006 | Malik | ..................... | H04L 51/48 713/168 |
| 7,155,722 | B1 * | 12/2006 | Hilla | ..................... | G06F 11/348 709/227 |
| 7,194,761 | B1 * | 3/2007 | Champagne | ............ | H04L 63/08 713/168 |

(Continued)

*Primary Examiner* — Aravind K Moorthy
(74) *Attorney, Agent, or Firm* — Foley & Lardner LLP

(57) ABSTRACT

A system and method for managing user identity information in a multi-tenant environment can perform operations including assigning a first address from an address pool for a first user session, storing first information for the first user session in the memory linked to the first address, and assigning a second address from the address pool for a second user session. The operations can also include storing second information for the second user session in the memory linked to the second address from the address pool for the second user session if the second address does not match a third address from the address pool for a third session in the memory, and forwarding communication data for the second user session after the second information has been stored.

20 Claims, 2 Drawing Sheets

(56) References Cited

U.S. PATENT DOCUMENTS

| | | | |
|---|---|---|---|
| 7,310,671 B1* | 12/2007 | Hassell | H04L 43/0811 709/224 |
| 7,321,926 B1* | 1/2008 | Zhang | H04L 67/1017 718/104 |
| 7,366,136 B1* | 4/2008 | Kalbag | H04L 12/14 455/406 |
| 7,787,450 B1* | 8/2010 | Chan | H04L 12/5602 370/236 |
| 8,189,473 B1* | 5/2012 | Breau | H04L 61/5061 370/429 |
| 8,356,343 B1* | 1/2013 | Breau | H04W 12/062 713/153 |
| 8,804,729 B1* | 8/2014 | Melman | H04L 63/1466 726/13 |
| 8,984,110 B1* | 3/2015 | Asveren | H04L 65/1104 709/224 |
| 8,990,405 B2* | 3/2015 | Popescu | H04L 69/22 709/227 |
| 9,063,840 B1* | 6/2015 | Deshpande | G11C 15/04 |
| 9,262,642 B1* | 2/2016 | Roth | G06F 21/45 |
| 9,264,944 B1* | 2/2016 | Brewer | H04W 36/0016 |
| 9,274,974 B1* | 3/2016 | Chen | G06F 12/109 |
| 9,621,582 B1* | 4/2017 | Hirsh | H04L 63/0227 |
| 9,871,870 B1* | 1/2018 | Hsieh | H04L 63/0407 |
| 10,033,616 B1* | 7/2018 | Zhu | H04L 47/70 |
| 10,237,738 B2* | 3/2019 | Lee | H04L 63/0876 |
| 10,270,865 B1* | 4/2019 | Heath | H04L 67/146 |
| 10,524,157 B2* | 12/2019 | Cho | H04W 28/24 |
| 10,616,760 B1* | 4/2020 | Salem | H04W 12/037 |
| 10,630,640 B1* | 4/2020 | Subbiah | H04Q 11/0005 |
| 10,911,407 B1* | 2/2021 | Warburton | H04L 63/0245 |
| 11,082,559 B1* | 8/2021 | Koneru | H04M 3/527 |
| 11,176,933 B1* | 11/2021 | Gundeti | H04L 12/282 |
| 11,283,883 B1* | 3/2022 | Krishan | H04M 15/41 |
| 11,290,422 B1* | 3/2022 | Chandra Mohan | H04L 61/2517 |
| 11,316,822 B1* | 4/2022 | Gawade | G06F 9/455 |
| 11,418,600 B1* | 8/2022 | Panem Jaya | H04L 67/141 |
| 11,445,003 B1* | 9/2022 | Katta | H04L 63/0236 |
| 11,456,987 B1* | 9/2022 | McKim | H04L 61/5007 |
| 11,483,278 B1* | 10/2022 | Lifshitz | H04L 61/2514 |
| 11,570,140 B1* | 1/2023 | Kapinos | H04L 61/5046 |
| 11,570,255 B2* | 1/2023 | Kruse | H04L 69/14 |
| 11,647,001 B1* | 5/2023 | Pabijanskas | H04L 63/0236 726/15 |
| 11,812,257 B2* | 11/2023 | Ho | H04W 12/106 |
| 11,895,086 B1* | 2/2024 | Carr | H04L 61/5061 |
| 11,909,767 B2* | 2/2024 | Yang | H04L 63/1466 |
| 11,973,836 B1* | 4/2024 | Eberlein | H04L 45/22 |
| 12,199,943 B2* | 1/2025 | Jin | H04L 61/35 |
| 12,232,015 B2* | 2/2025 | Kasi | H04W 24/04 |
| 2002/0032770 A1* | 3/2002 | Fertell | H04L 12/1813 709/224 |
| 2002/0099825 A1* | 7/2002 | Fertell | H04L 65/40 709/225 |
| 2003/0041268 A1* | 2/2003 | Hashimoto | G06F 21/31 726/4 |
| 2004/0004968 A1* | 1/2004 | Nassar | H04L 67/1038 370/389 |
| 2004/0198322 A1* | 10/2004 | Mercer | H04W 4/14 455/414.1 |
| 2005/0033653 A1* | 2/2005 | Eisenberg | G06Q 30/0641 705/26.8 |
| 2005/0066040 A1* | 3/2005 | Borella | H04L 67/14 709/228 |
| 2005/0094501 A1* | 5/2005 | Tsai | G11B 27/329 369/124.01 |
| 2005/0198099 A1* | 9/2005 | Motsinger | G06F 21/55 709/200 |
| 2006/0083242 A1* | 4/2006 | Pulkkinen | H04L 65/1043 370/392 |
| 2006/0190990 A1* | 8/2006 | Gruper | H04L 63/08 726/3 |
| 2006/0200469 A1* | 9/2006 | Chidambaran | H04L 67/14 |
| 2007/0002857 A1* | 1/2007 | Maher | H04L 61/2585 370/389 |
| 2007/0056022 A1* | 3/2007 | Dvir | H04L 63/08 726/4 |
| 2007/0162968 A1* | 7/2007 | Ferreira | H04L 61/2567 726/12 |
| 2008/0063169 A1* | 3/2008 | Wang | H04L 65/1069 379/201.01 |
| 2008/0101353 A1* | 5/2008 | Streijl | H04L 61/5061 370/389 |
| 2008/0104046 A1* | 5/2008 | Singla | H04L 63/1408 |
| 2008/0126258 A1* | 5/2008 | Jacobs | G06Q 20/322 705/64 |
| 2008/0281973 A1* | 11/2008 | Yang | H04L 61/59 709/227 |
| 2008/0304482 A1* | 12/2008 | Grassi | H04L 61/251 370/389 |
| 2008/0304487 A1* | 12/2008 | Kotecha | H04L 65/1076 455/466 |
| 2009/0113036 A1* | 4/2009 | Zampiello | H04L 67/104 709/224 |
| 2009/0240947 A1* | 9/2009 | Goyal | H04L 9/3247 713/176 |
| 2010/0070623 A1* | 3/2010 | Sawada | H04L 61/5084 709/224 |
| 2010/0135301 A1* | 6/2010 | Bosch | H04W 40/24 713/168 |
| 2010/0161771 A1* | 6/2010 | Wang | H04L 61/103 709/221 |
| 2010/0162336 A1* | 6/2010 | Chang | H04L 12/2801 725/111 |
| 2010/0189264 A1* | 7/2010 | Haddad | H04L 61/5076 380/283 |
| 2010/0278099 A1* | 11/2010 | Lee | H04L 65/1101 370/328 |
| 2010/0306410 A1* | 12/2010 | Jansen | H04L 67/51 709/245 |
| 2010/0333188 A1* | 12/2010 | Politowicz | H04L 63/1441 726/13 |
| 2011/0252469 A1* | 10/2011 | Cho | H04L 67/02 726/13 |
| 2011/0280215 A1* | 11/2011 | Nakagawa | H04W 36/144 370/331 |
| 2012/0008578 A1* | 1/2012 | Kant | H04W 36/0022 370/329 |
| 2012/0042058 A1* | 2/2012 | Shaikh | H04L 61/5061 709/227 |
| 2012/0072605 A1* | 3/2012 | Xu | H04L 63/0281 709/229 |
| 2013/0039367 A1* | 2/2013 | Ene | H04L 67/141 370/389 |
| 2013/0325929 A1* | 12/2013 | Kawabe | G06F 21/31 709/203 |
| 2014/0057613 A1* | 2/2014 | Ezell | H04W 4/50 455/417 |
| 2014/0078929 A1* | 3/2014 | Stan | H04L 61/5007 370/254 |
| 2014/0282893 A1* | 9/2014 | Sheller | H04L 63/08 726/4 |
| 2014/0293995 A1* | 10/2014 | Tanaka | H04L 65/1066 370/352 |
| 2014/0341181 A1* | 11/2014 | Sarkar | H04W 74/006 370/329 |
| 2015/0058469 A1* | 2/2015 | Li | H04L 43/08 709/224 |
| 2015/0089186 A1* | 3/2015 | Kim | G06F 9/3842 711/213 |
| 2015/0237527 A1* | 8/2015 | Knutson | H04W 12/08 726/4 |
| 2016/0080319 A1* | 3/2016 | Steele | H04L 61/5007 709/228 |
| 2016/0094614 A1* | 3/2016 | Ulupinar | H04L 41/14 709/219 |
| 2016/0127380 A1* | 5/2016 | Steele | H04L 63/14 726/7 |

(56) References Cited

U.S. PATENT DOCUMENTS

| | | | |
|---|---|---|---|
| 2016/0156484 A1* | 6/2016 | Matsuhara | H04L 67/1097 709/227 |
| 2016/0182372 A1* | 6/2016 | Holbrook | H04L 45/748 370/392 |
| 2016/0254999 A1* | 9/2016 | Labonte | H04L 47/17 370/392 |
| 2016/0315910 A1* | 10/2016 | Kaufman | H04L 61/4511 |
| 2016/0344687 A1* | 11/2016 | Rong | H04L 12/4641 |
| 2016/0352831 A1* | 12/2016 | Totolos | G06F 21/79 |
| 2017/0063838 A1* | 3/2017 | Yin | H04L 63/0823 |
| 2017/0093790 A1* | 3/2017 | Banerjee | H04L 67/131 |
| 2017/0099270 A1* | 4/2017 | Anson | H04L 63/123 |
| 2017/0104748 A1* | 4/2017 | Koster | H04L 9/3268 |
| 2017/0118275 A1* | 4/2017 | Singh | H04L 61/5007 |
| 2017/0201506 A1* | 7/2017 | Pang | H04W 48/12 |
| 2017/0293567 A1* | 10/2017 | Bryant | G06F 12/0831 |
| 2017/0318622 A1* | 11/2017 | Yi | H04L 61/5069 |
| 2017/0353391 A1* | 12/2017 | Piecuch | H04L 63/00 |
| 2018/0014340 A1* | 1/2018 | Hill | H04L 12/4633 |
| 2018/0083955 A1* | 3/2018 | Tuli | H04L 63/0861 |
| 2018/0309755 A1* | 10/2018 | Mishra | H04W 8/26 |
| 2019/0239270 A1* | 8/2019 | Lee | H04W 76/15 |
| 2019/0356742 A1* | 11/2019 | Ali | H04L 67/143 |
| 2019/0364115 A1* | 11/2019 | Asveren | H04L 65/1104 |
| 2019/0372933 A1* | 12/2019 | Kamisetti | H04L 63/0263 |
| 2020/0092714 A1* | 3/2020 | Chawre | H04L 61/2514 |
| 2020/0366642 A1* | 11/2020 | Zong | H04L 61/00 |
| 2020/0396159 A1* | 12/2020 | Rao | H04L 12/4641 |
| 2021/0044537 A1* | 2/2021 | Chunduri | H04L 43/08 |
| 2021/0103475 A1* | 4/2021 | Fretz | G06F 9/5022 |
| 2021/0176320 A1* | 6/2021 | Cui | H04L 67/141 |
| 2021/0185024 A1* | 6/2021 | Masuda | H04L 63/08 |
| 2021/0216320 A1* | 7/2021 | Espy | G06F 12/109 |
| 2021/0218551 A1* | 7/2021 | Moriarty | H04L 9/0643 |
| 2021/0400766 A1* | 12/2021 | Tzou | H04W 88/06 |
| 2022/0030115 A1* | 1/2022 | Wang | H04L 65/70 |
| 2022/0070223 A1* | 3/2022 | Deng | H04L 63/0245 |
| 2022/0123934 A1* | 4/2022 | Chen | H04L 9/0819 |
| 2022/0131798 A1* | 4/2022 | Akl | H04W 40/24 |
| 2022/0131813 A1* | 4/2022 | Katta | H04L 47/72 |
| 2022/0131835 A1* | 4/2022 | Fenton | H04L 63/1425 |
| 2022/0141134 A1* | 5/2022 | Lin | H04L 45/745 370/328 |
| 2022/0141212 A1* | 5/2022 | Kumar | H04L 63/0807 726/4 |
| 2022/0163954 A1* | 5/2022 | Balasubramanian | H04L 49/00 |
| 2022/0224782 A1* | 7/2022 | Wu | H04L 69/323 |
| 2022/0294660 A1* | 9/2022 | Takei | H04L 45/66 |
| 2022/0322199 A1* | 10/2022 | Jang | H04W 28/02 |
| 2022/0353335 A1* | 11/2022 | Fei | H04L 69/162 |
| 2022/0385623 A1* | 12/2022 | Henry | H04L 61/5014 |
| 2022/0386117 A1* | 12/2022 | Henry | H04W 12/06 |
| 2022/0417755 A1* | 12/2022 | Henry | H04W 12/06 |
| 2023/0020458 A1* | 1/2023 | Chaudhary | G06F 11/1464 |
| 2023/0023004 A1* | 1/2023 | Singh | G06F 16/958 |
| 2023/0062198 A1* | 3/2023 | Chen | G06F 16/283 |
| 2023/0064153 A1* | 3/2023 | Kulandaivel | G07C 5/0816 |
| 2023/0086281 A1* | 3/2023 | Kaidi | H04L 63/20 726/22 |
| 2023/0103230 A1* | 3/2023 | Pang | G06F 12/1027 711/207 |
| 2023/0104544 A1* | 4/2023 | Wang | G06F 3/065 711/154 |
| 2023/0169162 A1* | 6/2023 | Torola | G06F 9/54 726/21 |
| 2023/0262465 A1* | 8/2023 | Ficara | H04W 12/122 455/411 |
| 2023/0262798 A1* | 8/2023 | Choukir | H04L 61/5038 370/329 |
| 2023/0344837 A1* | 10/2023 | Maheshwari | G06F 21/6218 |
| 2023/0353421 A1* | 11/2023 | Hatte | H04L 12/4633 |
| 2023/0376612 A1* | 11/2023 | Parekh | G06F 21/602 |
| 2024/0031910 A1* | 1/2024 | Kasi | H04W 8/26 |
| 2024/0039897 A1* | 2/2024 | Gundavelli | H04L 63/166 |
| 2024/0073256 A1* | 2/2024 | Grover | H04L 65/1045 |
| 2024/0073698 A1* | 2/2024 | Verma | H04L 63/1408 |
| 2024/0114039 A1* | 4/2024 | Cozma | H04L 63/1416 |
| 2024/0137428 A1* | 4/2024 | Deshmukh | H04L 45/745 |
| 2024/0169219 A1* | 5/2024 | Vaishnav | G06F 9/4881 |
| 2024/0214802 A1* | 6/2024 | Gupta | H04L 63/065 |
| 2024/0220519 A1* | 7/2024 | Badii | G06F 16/3334 |
| 2024/0259887 A1* | 8/2024 | Foti | H04W 36/0027 |
| 2024/0276342 A1* | 8/2024 | Dimitrovski | H04M 15/8214 |

* cited by examiner

SYSTEMS OF AND METHODS FOR MANAGING TENANT AND USER IDENTITY INFORMATION IN A MULTI-TENANT ENVIRONMENT

CROSS-REFERENCE TO RELATED APPLICATIONS

This application claims the benefit of and priority to U.S. Provisional Application No. 63/440,053, filed on Jan. 19, 2023, the entire disclosure of which is hereby incorporated by reference herein.

FIELD OF THE DISCLOSURE

This disclosure relates to communication networks. More specifically, this disclosure relates to a system and method for management of identity information.

BACKGROUND OF THE DISCLOSURE

Security vendors are moving from products in the form of on-premises appliances to services offered in various public clouds. Multi-tenancy solutions have been developed to provide a cost effective and scalable solution in the cloud. Multi-tenancy refers to technology where a single service/application component is capable of handling simultaneous requests from multiple different customers. Multi-tenancy does not require that customer-specific service/application instances be set up in certain situations. Service providers do not need to manage separate service instances dedicated to specific customers, and the shared compute resource pool can elastically scale per demand.

Multi-tenancy generally utilizes a multi-tenant cluster which is shared by multiple groups of users and/or workloads (often referred to as tenants). The operators of multi-tenant clusters often isolate tenants from each other to minimize the damage that a compromised or malicious tenant can do to the cluster and other tenants. Customers also expect that their data should remain distinct from other tenants and that no data relating to their policies and reports should be accessible by other tenants. Also, certain cluster resources may be allocated among tenants according to fairness policies or algorithms to ensure that individual tenants do not dominate the use of resources unfairly.

Customers of the multi-tenant clusters generally use RFC (Request For Comments—Internet Working Group) 1918 private internet address spaces for local internal networks which can be called a customer client address name space (CCAN). The customers can use other address name spaces as well such as name spaces associated with various Internet Protocol (IPv6) allocation schemes. These addresses are often used simultaneously within distinct customer environments. However, when these addresses are used by clients connecting through a multi-tenant service or other multi-user virtual network, these overlapping addresses cannot be used to identify clients uniquely unless the addresses are mapped to another client address name space which can be called a service client address namespace (SCAN). This address mapping is called source network address translation (NAT) or srcNAT.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
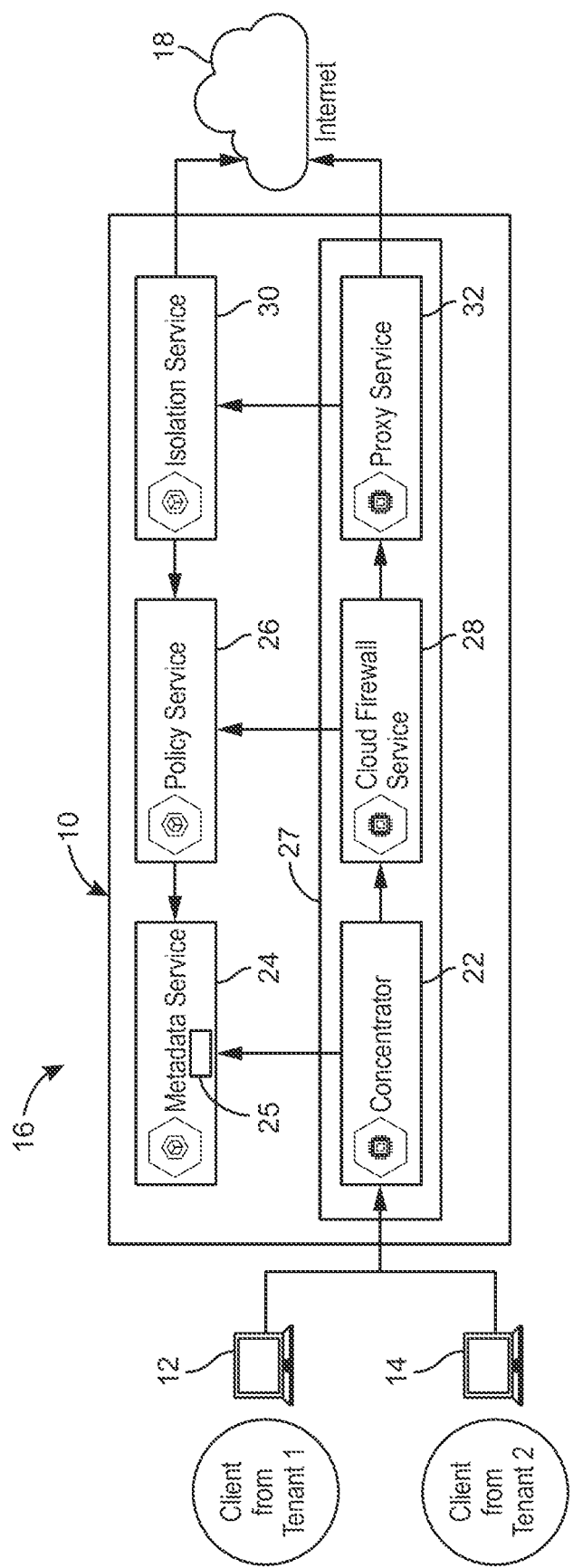
FIG. 1 is a block diagram of an example system for managing tenant and user identity information in a multi-tenant environment according to some embodiments.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION

As will be described in greater detail below, the present disclosure describes various systems for and methods of managing tenant and/or user identity information (e.g., addresses and session identification in a multi-tenant environment (e.g., a multi-tenant cloud environment)). Features from any of the embodiments described herein may be used in combination with one another in accordance with the general principles described herein. These and other embodiments, features, and advantages will be more fully understood upon reading the following detailed description in conjunction with the accompanying drawings and claims.

The present disclosure is generally directed to systems and methods that provide a cloud based service (e.g., a cloud based web security service (WSS)) that protects internet customer traffic. In some embodiments, multiple customers' or tenants' internet traffic is forwarded to the closest or most appropriate multi-tenant WSS pod. WSS includes components including but not limited to a secure access cloud service, a cloud firewall service, a service providing encryption/decryption, a service for malware scans, a service for enforcement of acceptable use and threat enforcement policies, a cloud access security broker (CASB) service, a data loss prevention (DLP) solution service, a service for trusted information sites, etc. A load balancer can forward traffic from different connections to different pods based upon balancing algorithms as opposed to pre-configured rules in some embodiments. In some embodiments, the pods employ systems and methods that process the traffic from multiple locations and users even though the traffic is associated with overlapping addresses (e.g., overlapping address in each tenant's CCAN). A virtual private network (VPN) gateway or router associated with the pod can perform source network address translation to ensure the customer user's traffic is uniquely mapped to a specific internet protocol (IP) address. The VPN gateway is a component of the WSS pod (e.g., concentrator 22 in FIG. 1 discussed below). The VPN is a component that connects two or more networks to a WSS or one or more networks in some embodiments. The gateway can be a component of a pod and can provide network translations or other processing according to protocol in some embodiments. In some embodiments, the systems and methods distribute srcNAT mapping to other components to enforce multi-tenant policies. A component may refer to one or more of a hardware unit, a software unit, or a combination thereof in some embodiments.

In some embodiments, systems and methods manage the life cycle of addresses in the SCAN so that active clients in the CCAN are uniquely identified as clients in the SCAN. The systems and methods accommodate complexities associated with the lifetime of a client actively passing traffic through the WSS being in a range from several seconds to several months, complexities associated with the WSS being a distributed system with many components that need to identify the customer and client for each new connection, and complexities associated with variable number of clients from different customer networks (e.g., from hundreds to hundreds of thousands of users). In some embodiments, a central database is not utilized to manage the addresses with reference counting so that the high volumes can be addressed more practically.

In some embodiments, the systems and methods ensure consistency with respect to client/tenant identification or addresses. In some embodiments, the systems and methods ensure the value associated with a key matches what a producer has or that that the value does not exist at any time on any service component. The systems and methods ensure that a consumer does not have some value associated with a key where the metadata does not match the producer's value in some embodiments. Values can include but are not limited to: session information [Session-Info or NAT-info], keys: [cluster-id, NAT-IP], tenant-id, real-id, access-type, user-id, client-context, expiry-time-utc, and pre-expiry-check-interval. User identification can include but is not limited to: User-Info, Key: [tenant-id, user-id], Value: goi-version, groups, attributes, precheck interval, and expiry-time-utc.

According to one example, a conventional system can misidentify traffic in certain scenarios. Scenario 1:
1. User X of tenant A begins a session or arrives and concentrator assigns an address of 10.100.1.1 to the session.
   a. The concentrator publishes a message related to the assigning of the address [Add, 10.100.1.1, tenant A].
   b. A cloud firewall service receives the message and associated traffic of tenant A from 10.100.1.1.
2. Tenant A—User X's session becomes inactive and concentrator deletes the session.
   a. The concentrator publishes a message related to the deletion [DELETE, 10.100.1.1].
   b. A network infrastructure issue or error occurs and the message related to the deletion is lost.
   c. The cloud firewall service still associates address 10.100.1.1 with tenant A.
3. Sometime later (e.g., 10 minutes), User Y of Tenant B begins a session or arrives and the concentrator assigns an address of 10.100.1.1 to the session.
   a. The concentrator publishes a message related to the assigning of the address [Add, 10.100.1.1, tenant B].
   b. Packet arrives before the add message because the add message is sent out of band.
   c. A cloud firewall service receives packets and associates the traffic with tenant A.

In Scenario 1, the pod misidentifies end user Y's traffic to an incorrect tenant A due to the missed message related to the deletion and a race condition where the packets arrived from tenant B before the add message.

Scenario 2:
1. User X of tenant A begins a session or arrives and the concentrator assigns an address of 10.100.1.1 to the session.
   a. The concentrator publishes a message related to the assigning of the address [Add, 10.100.1.1, tenant A].
   b. A cloud firewall service receives the message and associated traffic of tenant A from 10.100.1.1.
2. Tenant A—User X's session becomes inactive and the concentrator deletes the session.
   a. The concentrator publishes a message related to the deletion [DELETE, 10.100.1.1].
   b. A network infrastructure issue or error occur and the message related to the deletion is lost.
   c. The cloud firewall service still associates address 10.100.1.1 with tenant A.
3. Sometime later (e.g., 10 minutes), User Y of tenant B begins a session or arrives and the concentrator assigns an address of 10.100.1.1 to the session.
   a. The concentrator publishes a message related to the assigning of the address [Add, 10.100.1.1, tenant B].
   b. The network infrastructure issue or error fails to recover and the message related to the Add is lost.
4. User Y of tenant B starts a browser session.
   a. The concentrator assigns a srcNAT address of 10.100.1.1 to the session for user Y.
   b. The cloud firewall service receives the packets and associates the packets address 10.100.1.1 with tenant A.

In Scenario 2, the pod misidentifies end user Y's traffic to an incorrect tenant A due to the missed messages related to the deletion and addition. In some embodiments, the systems and methods described below prevent or reduce misidentifications according to the Scenarios 1 and 2 above.

Some embodiments relate to device for managing user identity information in a multi-tenant environment. The device includes one or more processors and memory storing instructions that, when executed by the one or more processors causes the one or more processors to perform operations. The operations include assigning a first address from an address pool for a first user session, storing first information for the first user session in the memory linked to the first address, and assigning a second address from the address pool for a second user session. The operations also include storing second information for the second user session in the memory linked to the second address from the address pool for the second user session if the second address does not match a third address from the address pool for a third session in the memory, and forwarding communication data for the second user session after the second information has been stored.

User identity information may refer to any type of data that indicates a tenant or user in some embodiments. User identity information can include, but is not limited to: user session information, addresses (e.g., scrCAN address, CCAN address, or IP address), tenant identification, user identification, client identification, device identification, etc. A multi-tenant environment may refer to any type of communication system or network involving two or more groups, each with one or more users, customers, or devices in some embodiments. In some embodiments, customers in the multi-tenant environment may share same computing resources (e.g., any type of services or platforms) while being unaware of each other and having each customer's data kept separate of each other in some embodiments. The multitenant environment can include, but is not limited to public cloud environment or a private cloud environment including but not limited to environments involving software as a service applications and/or a web service systems in some embodiments. An address may refer to any unique physical, virtual, or logical location that distinguishes a network node, memory location, user, or device from other network nodes, memory locations, users, or devices in some embodiments. An address pool may refer to a group or set of addresses in some embodiments. An address in the pool of address can be selected from the address pool, removed from the address pool, and entered into the address pool in some embodiments. The address pool can be stored in a memory such as a cache, content addressable memory, a database, or other storage device in some embodiments. A user session may refer to temporary and interactive information interchange (e.g., a connection oriented session) between two or more devices in some embodiments. A session is established at a certain point in time, and terminated at a later point in time in some embodiments. Linked may refer to a state where data is referenced to other data in some embodiments. Data can be linked by using tags, addresses, memory structures, fields, pointers, etc. in some embodiments. Matching or match may refer to data being compared for its similarity to other data in some embodiments. Matching can be performed using content addressable memory, direct data comparisons, or other matching algorithms in some embodiments. Communication data may refer to data communicated over a session in some embodiments. Communication data may be in a form of frames or other communication protocol units in some embodiments.

In some embodiments, the device includes one or more of gateways. A gateway may refer to a component or node that connects network to another device or network in some embodiments. A gateway can perform network translation and other communication processing operations in some embodiments.

In some embodiments, the second information includes a time value indicating when the second user session is valid. The phrase when the second user session is valid may refer to the user session being in a pending state (e.g., unexpired or not cancelled) in some embodiments. The time value can be a relative time value or an absolute time value in some embodiments.

In some embodiments, the first information includes tenant identification for the first user session, user identification for the first user session, or device specific information for the first user session, and the second information includes tenant identification for the second user session, user identification for the second user session, or device specific information for the second user session. Tenant identification may refer to an identity (e.g., an address or other nomenclature) of a group of users or devices in the multitenant environment in some embodiments.

In some embodiments, the memory includes a unit disposed as part of a metadata service component. The unit is configured to store the first information and the second information. A metadata service component may refer to a system that manages and/or processes data associated with an instance or session (e.g., processes metadata for user sessions in a multi-tenant environment) in some embodiments.

In some embodiments, the first address and the second address are in a service client address name space. A service client address name space may refer to an abstract space or collection of possible addresses, names, or identifiers of objects on a client system (e.g., addresses for use on a pod or network for a web service). Addresses for the service client address name space can be listed in the address pool in some embodiments.

In some embodiments, the second information includes a time value indicating when the second user session is valid.

The second session information is deleted when the time value indicates that the second user session is expired.

In some embodiments, the second information includes a soft expiration time. The first user session is checked for termination at the soft expiration time. A soft expiration time may refer to a value representing a time at which customer begins a pre-expiry check in some embodiments. The value can be a relative value or an absolute value in some embodiments. In some embodiments, the pre-expiry check provides a mechanism for preventing a potential gap where a component may not have a valid user session information for the user traffic in some embodiments. The potential gap can be caused by a delay in traffic flow or incorrect policy enforcement on the traffic. The component re-queries the user-session from the metadata server in the pre-expiry check and as a result of the pre-expiry check can determine if the session is still pending and can update the expiration time.

In some embodiments, the second information includes a hard expiration time. The first address is returned to the address pool after a predetermined time after the hard expiration time. A hard expiration time may refer to a value representing a time at which a session is expired in some embodiments. The value can be a relative value or an absolute value in some embodiments.

Some embodiments relate to a web service system in a multi-tenant environment. The web service system includes one or more components configured to assign a first service address for a first user session. The service address is from an address pool of service addresses. The one or more components are also configured to store first data for the user session. The first data is linked to the first service address and includes an expiration time parameter for the user session. The expiration time parameter may refer to a hard expiration time or a soft expiration time in some embodiments. In some embodiments, one component can be configured to assign a first service address and another component can configured to store the data. A web service system refers to a system that performs specific tasks or sets of tasks over a network. The web service system may operate on a platform such as a pod in some embodiments.

In some embodiments, the one or more components are configured to assign a second service address from the address pool for a second user session, store second data for the second user session linked to the second service address from the address pool for the second user session if the second address does not match a third service address from the address pool for a third session in the memory.

In some embodiments, the one or more components include a metadata service or a data concentrator. A metadata service may refer to a system that manages and/or processes data associated with an instance or session (e.g., processes metadata for user sessions in a multitenant environment) in some embodiments. A data concentrator may refer to a device that aggregates and forwards data. The data concentrator may operate according to a sharing scheme, provide isolation, and a routing strategy in some embodiments.

Some embodiments relate to a method of managing user identity information in a multi-tenant environment. The method includes assigning a first address from an address pool for a first user session, and storing first information for the first user session in a memory linked to the first address. The method also includes assigning a second address from the address pool for a second user session, storing second information for the second user session in the memory linked to the second address from the address pool for the second user session, and forwarding communication data for the second user session after the second information has been stored.

In some embodiments, the method is performed using a gateway. In some embodiments, the method is performed using a data concentrator. In some embodiments, the method is performed on a web security service pod. A web security service pod may refer to any platform that provides security operations for a session over a network in some embodiments.

In some embodiments, the first information includes tenant identification for the first user session, user identification for the first user session, or device specific information for the first user session. In some embodiments, the second information includes a hard expiration time and a soft expiration time.

In some embodiments, the method further includes resetting the soft expiration time and the hard expiration time in the second session information if the second user session has not terminated after a first period of time. In some embodiments, the method further includes providing the second address to the address pool after a predetermined amount of time after the hard expiration time has expired.

With reference to FIG. 1, an exemplary system manages user identity information in a multi-tenant environment. Detailed descriptions of corresponding computer-implemented methods are also discussed below. In addition, detailed descriptions of the systems and method are disclosed below with respect to a multi-tenant environment 10 that is cloud-based. In some embodiments, environment 10 includes multiple functional components that can scale independently at each section of the data path.

Multi-tenant environment 10 includes a client device 12 from a first tenant and a client device 14 from a second tenant using a web service system 16. Environment 10 is a distributed system containing many producers and consumers, and the web service system 16 ensures that there is no overlap in the NAT addresses used to uniquely identify each client device 12 and 14. Environment 10 is a communication environment where two or more tenants share one or more network resources in some embodiments.

Client devices 12 and 14 are in communication with the internet 18 via the web service system 16. Web service system 16 includes a concentrator 22, a metadata service 24, a policy service 26, a cloud firewall service 28, an isolation service 30 and a proxy service 32. Any number of client devices 12 and 14 and tenants can be in communication with concentrator 22 or web service system 16. Client devices 12 and 14 can be from different tenant or from the same tenant in some embodiments. Web service system 16 can be implemented using pods or other processing devices and may include more or fewer components than shown in FIG. 1.

In some embodiments, concentrator 22, proxy service 32, and cloud firewall service 28 are provided on a pod 27. In some embodiments, environment 10 includes multiple pods such as pod 27. In some embodiments, each functional component in the pod can scale independently.

In some embodiments, client device 12 from tenant 1, and client device 14 from a different tenant 2 communicate data that traverses environment 10 (e.g., a cloud infrastructure). Concentrator 22 maps each tenant and client device 12 and 14 to a unique NAT address and is a producer of the metadata or information associated with the NAT address in some embodiments. The metadata is provided to the metadata service 24 which includes memory 25 for storing records associated with a session in some embodiments.

Memory 25 can be internal to metadata service 24 or can be an external memory (e.g., a key value store database). The metadata includes a lease time for which the entry or record for the session is valid. The policy service 26 and multiple other data path components that rely on the policy service 26 (e.g., cloud firewall service 28) are consumers of the metadata that is retrieved from the metadata service 24. The metadata is linked to the NAT address in some embodiments.

As illustrated in FIG. 1, one or more of the components in FIG. 1 may also include one or more memories or memory devices. The memory can be any type or form of volatile or non-volatile storage device or medium capable of storing data and/or computer-readable instructions. In one example, the memory may store, load, and/or maintain one or more of the, one or more of the components in FIG. 1. Examples of the memory include, without limitation, Random Access Memory (RAM), flash memory, Hard Disk Drives (HDDs), Solid-State Drives (SSDs), optical disk drives, caches, variations or combinations of one or more of the same, and/or any other suitable storage memory.

As illustrated in FIG. 1, the one or more of the components in FIG. 1 may also include one or more physical processors. The physical processor may be any type or form of hardware-implemented processing unit capable of interpreting and/or executing computer-readable instructions. In one example, the physical processor may access and/or modify one or more of the one or more of the components in FIG. 1 stored in the memory. Additionally, or alternatively, the physical processor may execute one or more of modules to facilitate managing a tenant and user identity. Examples of the physical processor include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Concentrator 22 is a device that aggregates and forwards data packets within environment 10. Concentrator 22 can also perform routing operations and can receive and provide packets on a network (wide area network (WAN)) in communication with client devices 12 and 14. In some embodiments, concentrator 22 receives buffered packets and places them into a single queue (e.g., FIFO buffers) for linear handling. In some embodiments, concentrator 22 handles multiple streams or threads and combines them into a single point of service.

Metadata service 24 is in communication with policy service 26 and concentrator 22. Metadata service 24 is a device that processes or manages metadata in some embodiments. In some embodiments, metadata service 24 is a platform configured to deploy metadata and facilitate metadata interchange between software tools and/or components within web service system 16. Metadata service 24 includes a repository or store for object definitions in some embodiments. In some embodiments, metadata service 24 is a component for managing metadata used in managing tenant and user identities in environment 10. Metadata service 24 includes memory 25 for storing metadata in some embodiments. The metadata includes but are is limited to: session information, lease times, hard expiration time, soft expiration time, scrCAN address, CCAN address, tenant identification, IP address, time stamps, user identification, tenant identification, client identification, expiration check intervals, renewal information, and other attributes. Memory 25 provides a structure for linking the NAT address to the user session in some embodiments.

In some embodiments, concentrator 22 is configured to not forward traffic from a session until session information can be added to memory 25. If memory 25 has an existing session with a same srcNAT IP address, concentrator 22 is not allowed to create the new session information in some embodiments. Concentrator 22 is configured to terminate that user session and reestablish that session with a different srcNAT IP in that scenario according to some embodiments. In some embodiments, metadata service 24 provides concentrator 22 a success message once the metadata has been successfully with the NAT address and provides a not successful message if the metadata has not been successfully stored (e.g., due to the NAT address already being utilized. The metadata service 24 can utilize a matching algorithm to scan the memory to determine if the NAT address is utilized in some embodiments.

In some embodiments, memory 25 includes a content addressable memory associated with an address pool. If an address is used in the address pool, that address is marked as absent. Metadata service 24 only uses new addresses that are available in the address pool in some embodiments. The content addressable memory allows the presence or absence of addresses in the address pool to be checked quickly.

Policy service 26 is in communication with metadata service 24 and isolation service 30. Policy service 26 is a device configured to implement a policy for environment 10. In some embodiments, policy service 26 provides rule-based authorization engine for implementing tenant specific policies. Policy service 26 can provide default security policies for environment 10 in some embodiments.

Cloud firewall service 28, proxy service 32, and isolation service 30 are in the data path between internet 18 and client devices 12 and 14. Cloud firewall service 28, proxy service 32, and isolation service 30 are multiple datapath services that utilize multi-tenant policy that requires the unique identification of the tenant in order to evaluate the datapath traffic and enforce verdicts such as allow/deny and other processing of the traffic based on the tenant policy in some embodiments.

According to one example, concentrator 22 acts as a virtual private network gateway (VPN) that handles VPN tunnels (e.g., tunnel X for user X of customer A and tunnel Y for user Y of customer B) from many customers or tenants (e.g., customer A and B) in some embodiments. Customer A and customer B have branch networks that contain overlapping subnets (e.g., user X is coming from address 192.168.100.1 and user Y is coming from the same address 192.168.100.1). Concentrator 22 is an IP concentrator that performs a one to one source NAT from an assigned NAT pool to help distinguish traffic from users X and Y in some embodiments. User X's traffic from tunnel X is assigned srcNAT 10.100.1.1 after the VPN packet is decrypted, and user Y's traffic from tunnel Y is assigned srcNAT 10.100.1.2 after the VPN packet is decrypted. Concentrator 22 publishes srcNAT rules [Add, 10.100.1.1, tenant A] and [ADD, 10.100.1.2, tenant B] to metadata service 24. Metadata service 24 uses the srcNAT rules to check for the availability of the added addresses and stores metadata in memory 25. The metadata is linked to the added addresses.

In another example, web service system 16 has the following features and operates as follows:

1. An external memory or store (e.g., memory 25) is used to hold known tenant identifications associated with each user session assigned by concentrator 22.

a. Each entry is keyed off the srcNAT IP address assigned with the user session (e.g., assigned by concentrators, one concentrator 22 for each pod in some embodiments).

b. Multiple attributes associated with the session can be stored as values (e.g., tenant identification of that session, user identification of that session, device specific information, etc.).

c. The set of metadata attributes associated with the srcNAT IP address session information and the external store (e.g., memory 25) can be referred to as the metadata service store (MDS) below.

2. Each concentrator 22 is assigned a separate NAT pool for a set of pools in the srcNAT.

3. When concentrator 22 detects a new user session from a VPN tunnel:

a. Concentrator 22 assigns a new srcNAT IP address for the session.

b. Concentrator 22 creates a new session information record for the session.

c. The session has a hard expiration time (e.g., hard expiry set to <Now plus 12 minutes>) and a soft expiration time set to the hard expiration time minus 30 seconds. The hard expiration time is the lease time of the srcNAT record in some embodiments. The soft expiration time and the hard expiration are stored as values in the metadata for the session in some embodiments.

4. When concentrator 22 adds a new session information record to the MDS:

a. the MDS will fail the request if there is still a session with the same NAT IP address in the MDS.

b. the MDS will honor the hard expiration time of the new session information.

c. Concentrator 22 will not forward packets for this new session until the MDS acknowledges a successful addition of the session information record. This ensures from an MDS point of view that there are not any other sessions that are currently associated with the srcNAT IP address associated with the new session. (Or that any previous sessions assigned to that srcNAT IP address have all expired).

5. When a data pod component receives a packet whose source IP address has not been seen yet:

a. The data pod component queries the MDS for session information associated with the source IP address of the packet.

b. If the MDS already has created the session information, the record will be returned back to the data pod component, (e.g., cloud firewall service 28).

i. Cloud firewall service 28 enforces tenant policy per identification in the session information.

ii. Cloud firewall service 28 queries the MDS for any updated or renewed information at the soft expiration time.

iii. If the session information has not been renewed, cloud firewall service 28 deletes the session information at the hard expiration time of that session.

c. Otherwise, i. Cloud firewall service 28 cannot identify the tenant for the new session and will protect the user traffic using a set of default security policies.

ii. Cloud firewall service 28 continues to query the MDS for session information on a periodic basis for subsequent packet arrivals with exponential back off to avoid overloading the MDS.

6. Two minutes before hard expiration time, concentrator 22 renews the session information if the user's session has not been terminated.
   a. Session renewal is accomplished by resetting the soft expiration time and the hard expiration time in the session information by adding another twelve minutes.
   b. Periodic early renewal ensures that the session information continues to exist in the MDS if the user session has not been terminated.
   c. The consumer's preexpiry check at the soft expiration time ensures the consumer will not lose the session information if the session has not been terminated.
7. When concentrator 22 detects that a session has been terminated,
   a. The user session is marked as terminated.
   b. At the early renewal time (e.g., at the soft expiration time), concentrator 22 detects the session has been terminated and thus will not renew the session information in the MDS.
   c. When cloud firewall service 28 performs the pre-expiry check or query (e.g., at the soft expiration time), the hard expiration time in the session information remains the same because of the expiration and cloud firewall service 28 will not update its hard expiration time in the MDS or local cache.
8. When a user session expires on MDS or Cloud Firewall service,
   a. the MDS automatically deletes the session information record without a command from concentrator 22.
   b. cloud firewall service 28 (and all consumers of session information) expire the session information without a command from concentrator 22.
9. The same session expiration action takes place on concentrator 22.
   a. After hard expiration of the session information record, the associated srcNAT IP address does not immediately go back into the NAT pool.
   b. An extra 30 minute cooling off period is added. After expiration of the 30 minutes, the NAT IP address becomes reusable.
   c. The extra cooling off period ensures that the NAT IP address will not be used too soon in case a consumer has not expired the session information due to clock drift. Modern computers generally take several months for a 30 minute clock drift.
9. To provide extra protection for MDS consumers,
   a. If a session information record is returned from MDS whose expiration times is more than 12 minutes into the future, the consumer will cap its hard expiration time to the current time plus 12 minutes (<now>+12 minutes).
   b. If the returned session information whose expiration time has already passed on the consumer, the record is immediately rejected by the consumer.

In some embodiments, when cloud firewall service 28 receives a new connection, service 28 asks the policy service 26 what verdict it wants to enforce. The policy service 26 then asks the MDS for the metadata information and then uses that to run the tenant's policy and to render a verdict back to cloud firewall service 28. The specific steps and time periods provided in the examples above are exemplary only.

Advantageously, web service system 16 does not assume that a session is not alive until the session is explicitly deleted via a protocol message. A session is kept alive by concentrator 22 by periodically renewing the session in some embodiments. When there are network issues in environment 10 and a request to create a new session is lost, the MDS and consumers do not have the session information but the customer traffic is protected by default security policies and the traffic is not misidentified as the wrong client or tenant in some embodiments. When there are network issues in environment 10 and a request to receive new session information from the MDS is lost, the consumers do not receive the session information, but customer traffic is protected by default security policies and the traffic is not misidentified in some embodiments. When there are network issues in environment 10 and a request to renew a session is lost, the MDS and consumers eventually expire the session information but the customer traffic is protected by default security policies and the traffic is not misidentified in some embodiments. When there are network issues in environment 10 and a request to refresh session information from the MDS is lost, the consumers' session information will not be renewed and is deleted at the hard expiration time in some embodiments. However, the subsequent customer traffic from the session is protected by default security policies and the traffic is not misidentified in some embodiments. After the network is repaired, requests of concentrator 22 to create or renew session information records start to succeed and queries of the consumers start to succeed as the MDS is gradually replenished by concentrators. After a time, the whole system recovers automatically (e.g., fully automatically).

As discussed above, web service system 16 provides an elegant solution for maintaining metadata information for multi-tenancy applications with extensive protections to minimize or reduce tenant identity mismatches in some embodiments. Web service system 16 can use two requests: a set session information (SetSessionInfo) request and a get session information (GetSessionInfo) request. In some embodiments, a separate mechanism to resynchronize an MDS cache with a consumer's local cache is not required after network recovery. In some embodiments, web service system 16 is configured to automatically expire sessions so stale sessions do not exist.

Figure 2:
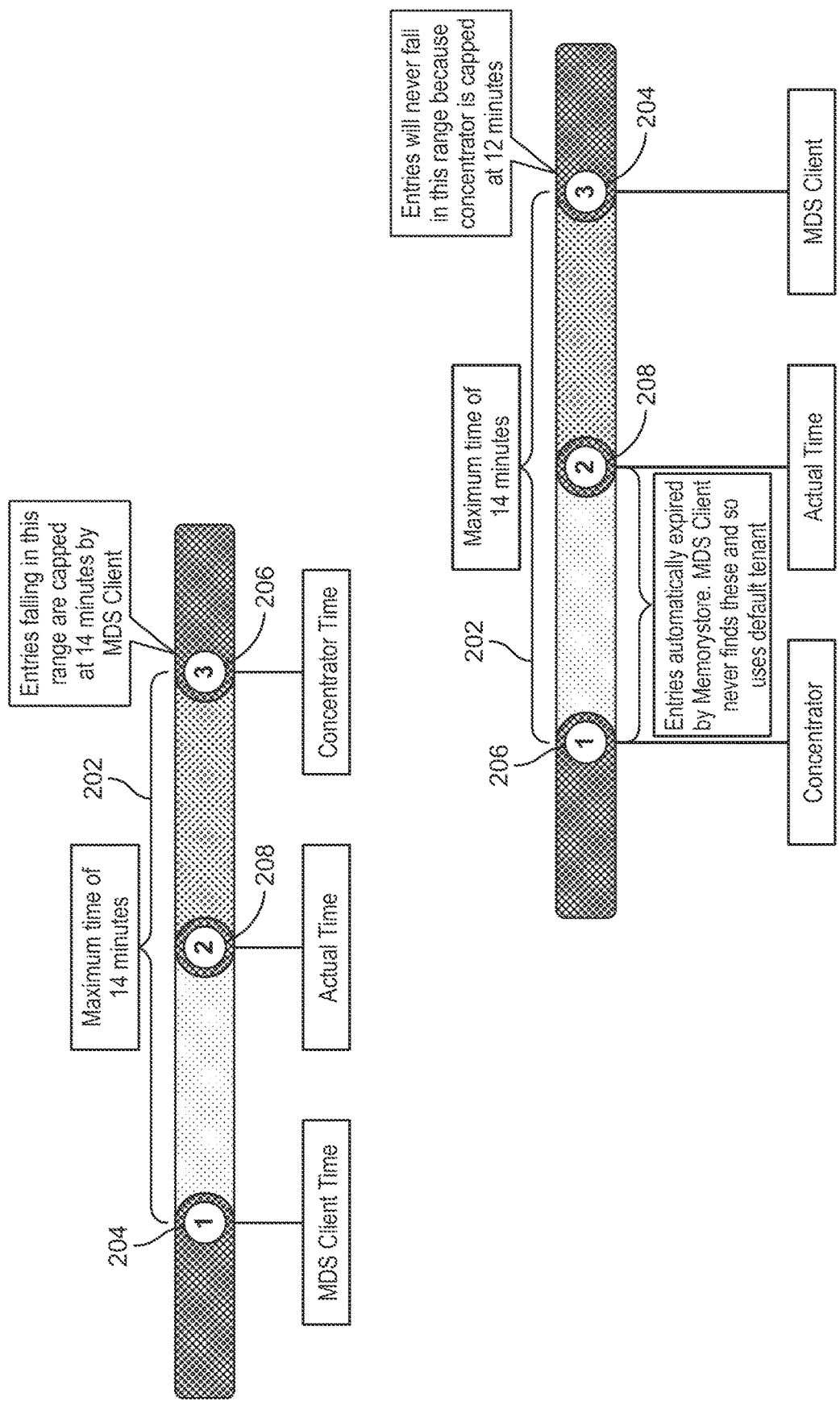
FIG. 2 is a timing diagram showing example guardrails against failed time synchronization in the multi-tenant environment illustrated in FIG. 1 according to some embodiments.

In some embodiments, web service system 16 is configured to ensure accurate clock synchronization between components. With reference to FIG. 2, web service system uses an algorithm to enforce a maximum discrepancy 202 (e.g., 14 minutes) between a time 204 at a client device 12 or 14 and a time 206 on the concentrator 22. Under normal circumstances, a network time protocol service is used to synchronize all components to the same network protocol service clock or time 208. If there is a bug in the software, or the network time protocol service is not working correctly, this design provides guardrails to ensure lease times do not exceed maximums and triggers an alarm notification to the system operator that a guardrail has been hit and an investigation is required to remediate. The guardrails enforce a safety zone that prevents clients from being misidentified. In some embodiments, the maximum lease time is set to less than one half the cool down period to ensure that a session will not be reused while resident in caches of components of web service system 16 even if the clock is out of synchronization.

Components of web service system 16 and client devices 12 and 14 generally can be any type or form of computing device capable of reading computer-executable instructions. For example, the computing device may include an endpoint device (e.g., a mobile computing device) running client-side security software. Additional examples of the computing devices include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Computing devices can include cloud servers in any type or form of computing device that is capable of reading computer-executable instructions. Additional examples of the cloud servers include, without limitation, security servers, application servers, web servers, storage servers, and/or database servers configured to run certain software applications and/or provide various security, web, storage, and/or database services.

The environment 10 includes networks which can be any medium or architecture capable of facilitating communication or data transfer. In one example, the networks may facilitate communication between the client devices 12 and 14, web service system 16 and Internet 18. In this example, the network may facilitate communication or data transfer using wireless and/or wired connections. Examples of the networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

The client devices 12 and 14 generally represent any type or form of computing device or system and may include but are not limited to mobile devices, wireless communication devices, computers, laptops, application servers and database servers. Client devices 12 and 14 can be coupled to web service system 16 by any type of communication network including but not limited to any telecommunication or computer network including, for example, an intranet, a WAN, a LAN, a PAN, a Storage Area Network (SAN) fabric, or the Internet. Client devices 12 and 14 may include or be coupled to one or more storage devices including but not limited to Network-Attached Storage (NAS) devices configured to communicate with the servers and using various protocols, such as Network File System (NFS), Server Message Block (SMB), or Common Internet File System (CIFS). The storage devices can be any type or form of storage device or non-transitory storage medium capable of storing data and/or other computer-readable instructions.

Client devices 12 and 14 can include a web browser or other client software. Such software may allow the client devices 12 and 14 to access data hosted by the servers on the Internet 18. Although FIG. 1 depicts the use of environment 10 for exchanging data with the Internet 18, the embodiments described and/or illustrated herein are not limited to environments that connect to the Internet or any particular network-based environment.

In at least one embodiment, all or a portion of one or more of the example embodiments disclosed herein may be encoded as a computer program and loaded onto and executed by the components of web service system 16 or any combination thereof. All or a portion of one or more of the example embodiments disclosed herein may also be encoded as a computer program, stored, run, and distributed to components of the web service system 16 and/or client device 12 and 14.

As detailed above, web service system 16 may perform and/or be a means for performing, either alone or in combination with other elements, one or more steps of an example method for managing user identification information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the environment 10 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of environment 10 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the environment 10 in FIG. 1 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of environment 10 in FIG. 1 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a headmounted display, smartwatches, etc.), and the like. In some examples, the mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the environment 10 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the environment 10 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of environment 10 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device for managing user identity information in a multi-tenant environment comprising one or more processors and memory storing instructions that, when executed by the one or more processors causes the one or more processors to perform operations comprising:
   assigning a first address from an address pool for a first user session;
   storing first information for the first user session in the memory linked to the first address;
   assigning a second address from the address pool for a second user session;
   storing second information for the second user session in the memory linked to the second address from the address pool for the second user session if the second address does not match the first address or a third address from the address pool for a third session in the memory; and
   forwarding communication data for the second user session after the second information has been stored.

2. The device of claim 1, wherein the device comprises one or more gateways.

3. The device of claim 1, wherein second information comprises a time value indicating when the second user session is valid.

4. The device of claim 1, wherein the first information comprises tenant identification for the first user session, user identification for the first user session, or device specific information for the first user session and the second information comprises tenant identification for the second user session, user identification for the second user session, or device specific information for the second user session.

5. The device of claim 1, wherein the memory comprises a unit disposed as part of a metadata service component, the unit being configured to store the first information and the second information.

6. The device of claim 1, wherein the first address and the second address are in a service client address name space.

7. The device of claim 1, wherein second information comprises a time value indicating when the second user session is valid, wherein the second information is deleted when the time value indicates that the second user session is expired.

8. The device of claim 1, wherein the second information comprises a soft expiration time, wherein the first user session is checked for expiration at the soft expiration time.

9. The device of claim 8, wherein the second information comprises a hard expiration time, wherein the first address is returned to the address pool after a predetermined time after the hard expiration time.

10. A web service system in a multi-tenant environment, the web service system comprising:
one or more components configured to assign a first service address for a first user session, the first service address being from an address pool of service addresses, wherein the one or more components are configured to store first data for the first user session, the first data being linked to the first service address and comprising an expiration time parameter for the first user session, wherein the one or more components are configured to assign a second service address from the address pool for a second user session, store second data for the second user session linked to the second service address from the address pool for the second user session if the second address does not match the first address or a third service address from the address pool for a third session.

11. The web service system of claim 10, wherein the first data comprises a soft expiration time.

12. The web service system of claim 10, wherein the one or more components comprise a metadata service or a data concentrator.

13. A method of managing user identity information in a multi-tenant environment, the method comprising:
assigning a first address from an address pool for a first user session;
storing first information for the first user session in a memory linked to the first address;
assigning a second address from the address pool for a second user session;
storing second information for the second user session in the memory linked to the second address from the address pool for the second user session if the second address does not match the first address or a third address from the address pool for a third session in the memory; and
forwarding communication data for the second user session after the second information has been stored.

14. The method of claim 13, wherein the method is performed using a gateway.

15. The method of claim 13, wherein the method is performed using a data concentrator.

16. The method of claim 13, wherein the method is performed on a web security service pod.

17. The method of claim 13, wherein the first information comprises tenant identification for the first user session, user identification for the first user session, or device specific information for the first user session.

18. The method of claim 13, wherein the second information comprises a hard expiration time and a soft expiration time.

19. The method of claim 18, further comprising resetting the soft expiration time and the hard expiration time in the second information if the second user session has not terminated after a first period of time.

20. The method of claim 19, further comprising:
providing the second address to the address pool after a predetermined amount of time after the hard expiration time has expired.

* * * * *